(12) United States Patent
Ryu et al.

(10) Patent No.: US 7,817,104 B2
(45) Date of Patent: Oct. 19, 2010

(54) AUGMENTED REALITY APPARATUS AND METHOD

(75) Inventors: Hee-seob Ryu, Suwon-si (KR); Dong-kyung Nam, Yongin-si (KR); Jong-ho Lea, Seongnam-si (KR); Sang-goog Lee, Anyang-si (KR); Young-jin Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 845 days.

(21) Appl. No.: 11/546,896

(22) Filed: Oct. 13, 2006

(65) Prior Publication Data

US 2007/0164988 A1    Jul. 19, 2007

(30) Foreign Application Priority Data

Jan. 18, 2006  (KR) ................... 10-2006-0005514

(51) Int. Cl.
*G09G 5/00* (2006.01)
(52) U.S. Cl. .................. 345/7; 345/632; 345/633; 396/133; 396/296; 396/51; 396/58
(58) Field of Classification Search .............. 345/8; 396/51, 58; 348/208
See application file for complete search history.

(56) References Cited

U.S. PATENT DOCUMENTS

| | | | | |
|---|---|---|---|---|
| 4,574,314 A | * | 3/1986 | Weinblatt | 348/345 |
| 5,138,555 A | * | 8/1992 | Albrecht | 701/14 |
| 5,189,463 A | * | 2/1993 | Capper et al. | 396/155 |
| 5,214,466 A | * | 5/1993 | Nagano et al. | 396/51 |
| 5,239,337 A | * | 8/1993 | Takagi et al. | 396/51 |
| 5,252,950 A | * | 10/1993 | Saunders et al. | 345/9 |
| 5,311,203 A | * | 5/1994 | Norton | 345/7 |
| 5,394,517 A | * | 2/1995 | Kalawsky | 345/632 |
| 5,428,413 A | * | 6/1995 | Shindo | 351/210 |
| 5,515,130 A | * | 5/1996 | Tsukahara et al. | 396/51 |
| 5,546,158 A | * | 8/1996 | Konishi et al. | 396/51 |
| 5,583,795 A | * | 12/1996 | Smyth | 702/150 |
| 5,625,765 A | * | 4/1997 | Ellenby et al. | 345/633 |
| 5,666,577 A | * | 9/1997 | McIntyre et al. | 396/296 |
| 5,682,332 A | * | 10/1997 | Ellenby et al. | 702/150 |
| 5,734,371 A | * | 3/1998 | Kaplan | 345/158 |
| 5,815,411 A | * | 9/1998 | Ellenby et al. | 702/150 |
| 5,870,136 A | * | 2/1999 | Fuchs et al. | 348/42 |
| 6,064,749 A | * | 5/2000 | Hirota et al. | 382/103 |

(Continued)

FOREIGN PATENT DOCUMENTS

JP       2004-38470       2/2004

(Continued)

*Primary Examiner*—Richard Hjerpe
*Assistant Examiner*—Dorothy Webb
(74) *Attorney, Agent, or Firm*—Staas & Halsey LLP

(57) ABSTRACT

An augmented reality apparatus and method in which the direction of a camera is adjusted to be consistent with a direction toward which a user faces and an augmented reality image is realized for a subject image incident from the adjusted camera direction. The augmented reality apparatus includes a viewing angle determination module which determines a viewing angle of a user, an image input module which receives an image of one or more subjects within the viewing angle of the user, an image synthesization module which generates a synthesized image by synthesizing the subject image with a digital image, and a display module which displays the synthesized image.

14 Claims, 12 Drawing Sheets

U.S. PATENT DOCUMENTS

| | | | |
|---|---|---|---|
| 6,278,479 B1 * | 8/2001 | Wilson et al. | 348/47 |
| 6,401,050 B1 * | 6/2002 | Cooke et al. | 702/127 |
| 6,424,843 B1 * | 7/2002 | Reitmaa et al. | 455/566 |
| 6,445,364 B2 * | 9/2002 | Zwern | 345/8 |
| 6,578,962 B1 * | 6/2003 | Amir et al. | 351/209 |
| 6,765,569 B2 * | 7/2004 | Neumann et al. | 345/419 |
| 7,199,767 B2 * | 4/2007 | Spero | 345/7 |
| 2002/0167442 A1 * | 11/2002 | Taylor | 342/357.09 |
| 2004/0001647 A1 * | 1/2004 | Lake et al. | 382/291 |
| 2004/0174434 A1 * | 9/2004 | Walker et al. | 348/211.3 |
| 2005/0275914 A1 * | 12/2005 | Vesely et al. | 359/13 |

FOREIGN PATENT DOCUMENTS

| | | |
|---|---|---|
| JP | 2004-341642 | 12/2004 |
| KR | 2005-78136 | 8/2005 |

\* cited by examiner

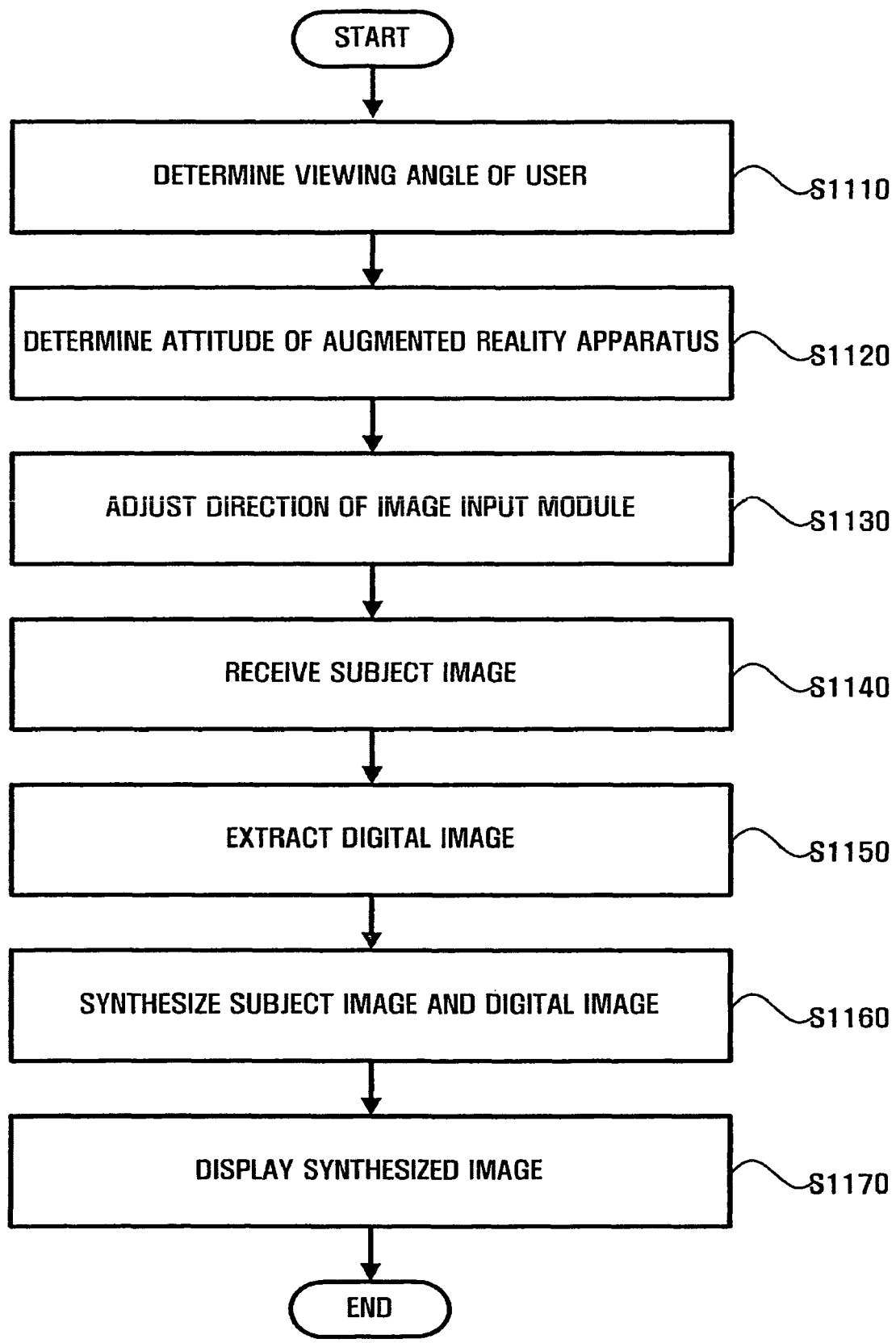

AUGMENTED REALITY APPARATUS AND METHOD

CROSS-REFERENCE TO RELATED APPLICATIONS

This application claims priority from Korean Patent Application No. 10-2006-0005514 filed on Jan. 18, 2006 in the Korean Intellectual Property Office, the disclosure of which is incorporated herein by reference in its entirety

BACKGROUND OF THE INVENTION

1. Field of the Invention

The present invention relates to an augmented reality apparatus and method and, more particularly, to an augmented reality apparatus and method in which the direction of a camera is adjusted to be consistent with a direction toward which a user faces and an augmented reality image is realized for a subject image incident from the adjusted camera direction.

2. Description of the Related Art

Recent developments in integration technology have opened the way for the spread of various portable devices such as audio reproduction apparatuses (e.g., cassette tape players and CD players), wireless pagers, mobile phones, MP3 players, and portable game players.

In particular, mobile phones are no longer only tools for telecommunications but are also tools for providing a variety of functions such as a clock function, a digital camera function, and an MP3 player function.

Virtual reality is one of the relatively new information technology paradigms that can allow people to experience various situations that they will never experience in real life due to some spatial and physical restrictions, by creating a computer-based artificial environment that interactively responds to the human sensory system. Virtual reality aims to establish a more immersive environment where humans and computers can effectively interact and communicate by enhancing human-computer conversation skills using a variety of input/output techniques. Such input/output techniques involve the use of, for example, head-mounted displays (HMD), data gloves, or motion capture systems. HMDs obtain data regarding variations in the position of a user by monitoring the movement of the head of the user, and transmit the data to a computer, thereby allowing the computer to calculate through simulation the size and depth of an object located within the viewing angle of the user.

Data gloves detect the positions and directions of the hands of a user who wear them. When the user moves his/her hands in a three-dimensional (3D) space, the data gloves transmit 3D coordinate data representing the movement of the hands of the user to a computer. Then, the computer manipulates an object corresponding to the data transmitted by the data gloves.

Augmented reality, which is the term derived from terminology regarding virtual environment and virtual reality, is a field of computer research which deals with the combination of real-world images and virtual-world images such as computer graphic images. Real world information may include information that is not necessarily needed by users or lack information that is needed by users. In a virtual environment created by a computer, such unnecessary information can be simplified or can be made invisible. In other words, augmented reality systems combine a real environment with virtual objects, thereby effectively interacting with users in real time.

Augmented reality has been widely used in various fields of application such as the entertainment field and the newscast field. We often see TV weather broadcasts where the forecaster appears in front of a weather chart that keeps changing naturally. In reality, the forecaster stands in front of a blue screen, and a virtual studio environment is established based on computer-generated virtual images, thereby realizing augmented reality.

Augmented reality can also be applied to the medical field. In detail, 3D data regarding a patient is obtained in real time using a medical imaging technique such as magnetic resonance imaging, computed tomography imaging, and ultrasound imaging, and the obtained 3D data is rendered as virtual images. Then, the virtual images are displayed by laying them over the patient, thereby enabling and facilitating image-guided medical surgeries. In addition, augmented reality can also be applied to the visors of the helmets of pilots or the windshields of cockpits to display virtual images and thus to present a variety of information necessary to the pilots.

In order to realize augmented reality, a camera which can receive real images and a display device such as an HMD which can display both real images and virtual images are needed. However, existing augmented reality systems are very expensive, and thus, are not affordable to most people.

In the meantime, Japanese Patent Laid-Open Gazette No. 2004-038470 discloses a mixed reality apparatus and method in which a real image is captured using an imaging unit, the direction toward which a user faces is determined based on the captured real image by a position/direction determination unit, the relationship between the position of the user and the position of a predetermined object is calculated, and data obtained as the result of the calculation is displayed in a virtual space in such a manner that the data can be laid over the captured real world image.

This mixed reality technique, however, involves detecting the direction toward which a user who wears an HMD faces and displaying an image incident from the detected direction, and thus needs additional equipment such as an HMD, like other existing augmented reality techniques. Therefore, it is necessary to develop methods to display augmented reality images according to the viewing angle of a user by using, for example, mobile phones which are relatively widespread.

SUMMARY OF THE INVENTION

The present invention provides an augmented reality apparatus and method in which the direction of a camera is adjusted to be consistent with a direction toward which a user faces and an augmented reality image is realized for a subject incident from the adjusted camera direction.

However, the aspects of the present invention are not restricted to the ones set forth herein. The above and other aspects of the present invention will become more apparent to one of daily skill in the art to which the present invention pertains by referencing a detailed description of the present invention given below.

According to an aspect of the present invention, there is provided an augmented reality apparatus. The augmented reality apparatus includes a viewing angle determination module which determines a viewing angle of a user, an image input module which receives an image of one or more subjects within the viewing angle of the user, an image synthesization module which generates a synthesized image by synthesizing the subject image with a digital image, and a display module which displays the synthesized image.

According to another aspect of the present invention, there is provided an augmented reality method. The augmented reality method includes determining a viewing angle of a user, receiving a subject image from the viewing angle of the user, generating a synthesized image by synthesizing the subject image with a digital image, and displaying the synthesized image.

BRIEF DESCRIPTION OF THE DRAWINGS

The above and other features and advantages of the present invention will become more apparent by describing in detail preferred embodiments thereof with reference to the attached drawings in which:

FIG. 11 is a flowchart illustrating an augmented reality method according to an embodiment of the present invention.

DETAILED DESCRIPTION OF THE PREFERRED EMBODIMENTS

Figure 1A:
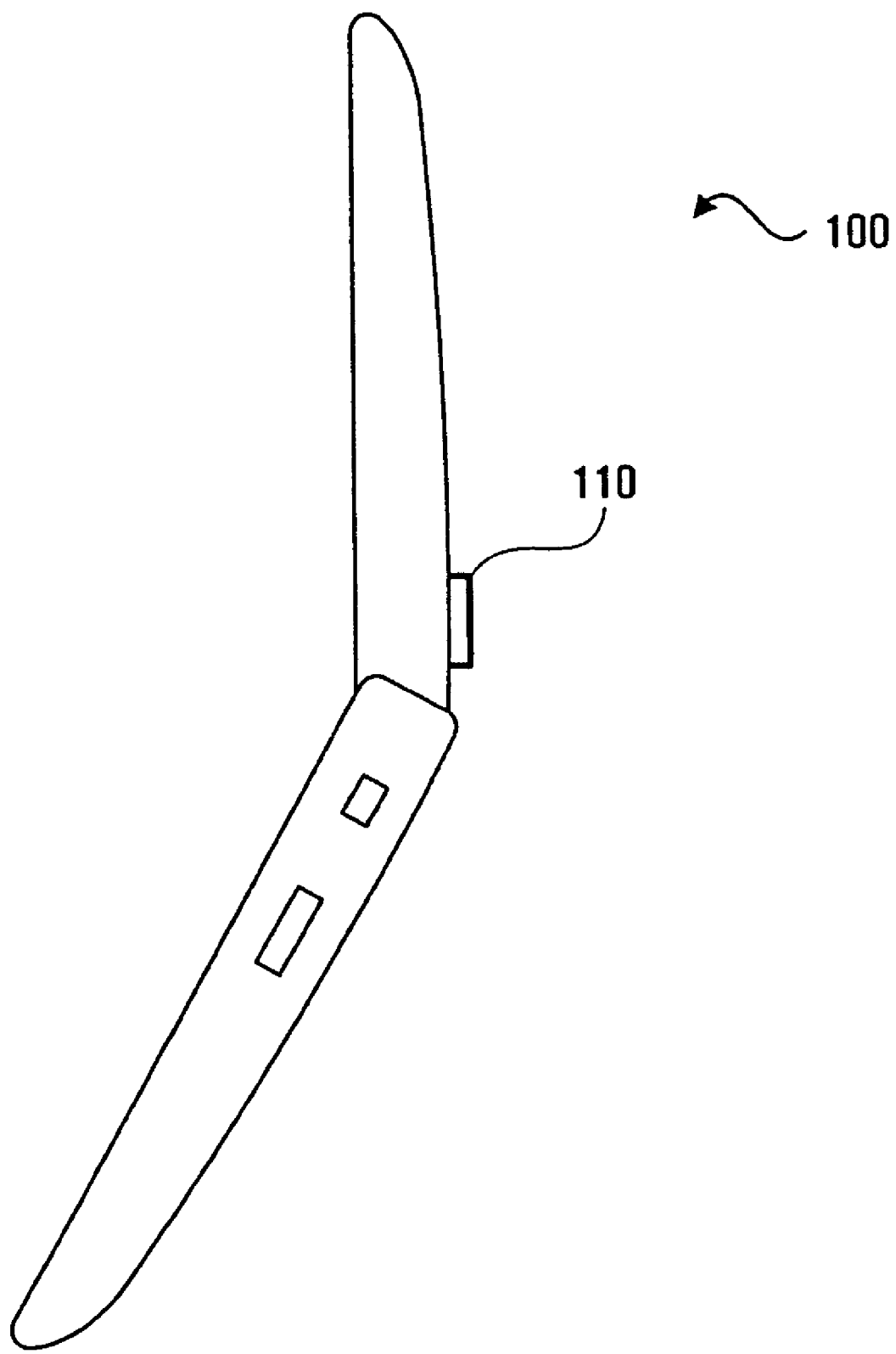
FIG. 1A is a side view of an augmented reality apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1A is a side view of an augmented reality apparatus 100 according to an embodiment of the present invention, particularly, a flip-type mobile phone having an augmented reality function. Referring to FIG. 1A, the augmented reality apparatus 100 may include a digital camera which receives a subject image. The augmented reality apparatus 100 may include a plurality of digital cameras 110.

The augmented reality apparatus 100 may include a driving unit which adjusts the direction of the digital camera 110 horizontally or vertically so that a subject corresponding to a subject image incident upon the digital camera 110 can be chosen even when the augmented reality apparatus 100 is fixed. The driving unit may adjust the direction of the digital camera 110 according to a viewing angle of a user and the attitude of the augmented reality apparatus 100.

Figure 1B:
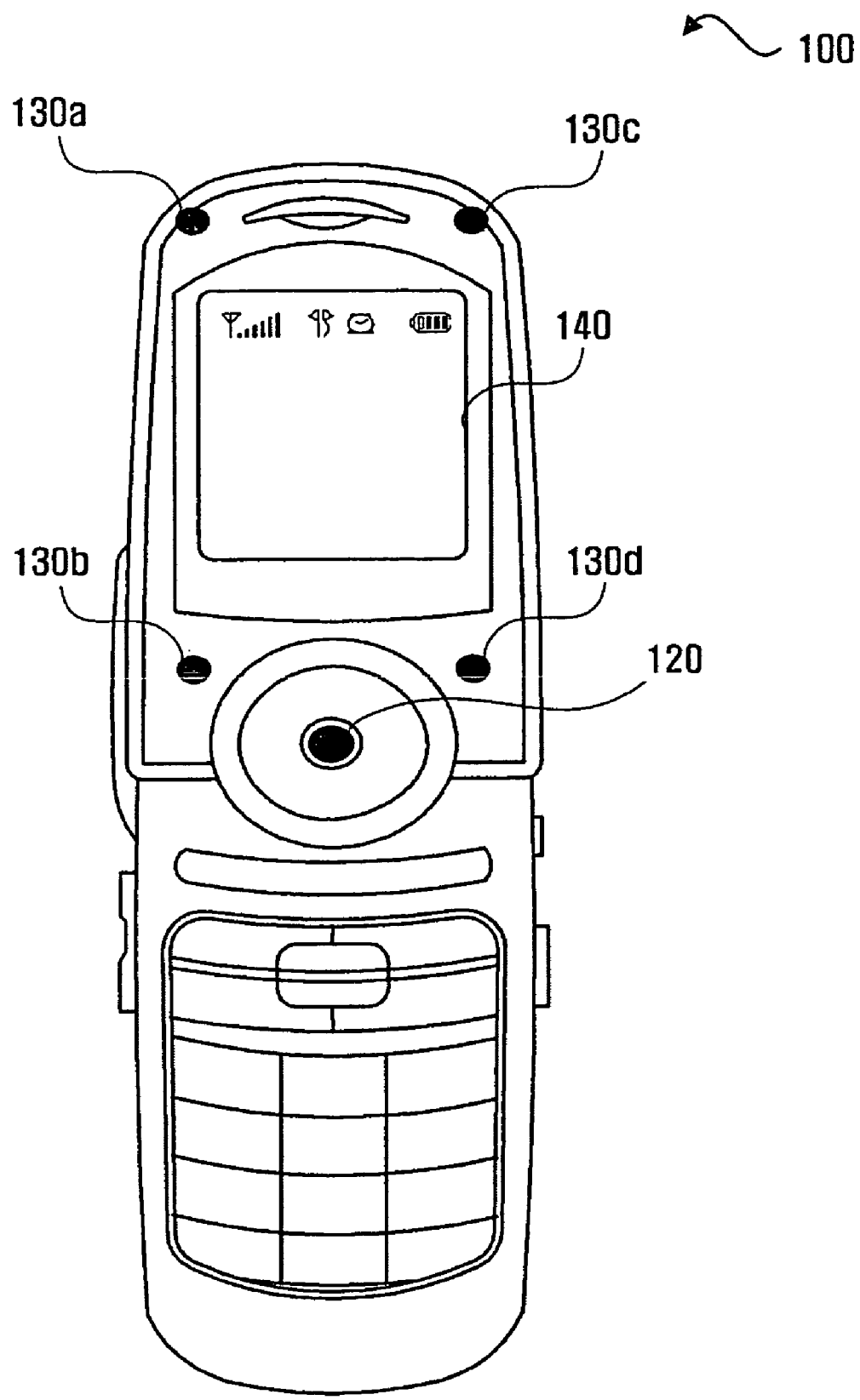
FIG. 1B is a front view of the augmented reality apparatus illustrated in FIG. 1A.

FIG. 1B is a front view of the augmented reality apparatus 100 illustrated in FIG. 1A. Referring to FIG. 1B, the augmented reality apparatus 100 may include a recognition unit 120 which determines a viewing angle of a user. The recognition unit 120 determines the viewing angle of the user by determining the positions of the pupils of the eyes of the user using another digital camera or an infrared (IR) filter.

Information regarding the user viewing angle determined by the recognition unit 120 is transmitted to the driving unit, and the driving unit adjusts the direction of the digital camera 110 so that the digital camera 110 can be consistent with the viewing angle of the user. The driving unit may adjust the direction of the digital camera 110 according to the attitude of the augmented reality apparatus 100. For this, the augmented reality apparatus 100 may include one or more attitude determination units 130a through 130d. The attitude determination units 130a through 130d determine a relative attitude of the augmented reality apparatus 100 with respect to the user.

Also, the augmented reality apparatus 100 may also include a display unit 140 which displays a subject image incident according to the viewing angle of the user. The augmented reality apparatus 100 may also include a position determination unit such as a global positioning system receiver. In this case, the augmented reality apparatus 100 may determine the position of the augmented reality apparatus 100 with the position determination unit, examine a subject corresponding to the incident subject image using the digital camera 110, synthesize the incident subject image with a digital image comprising information regarding the subject, and display a synthesized image obtained as the result of the synthesization using the display unit 140.

Figure 2:
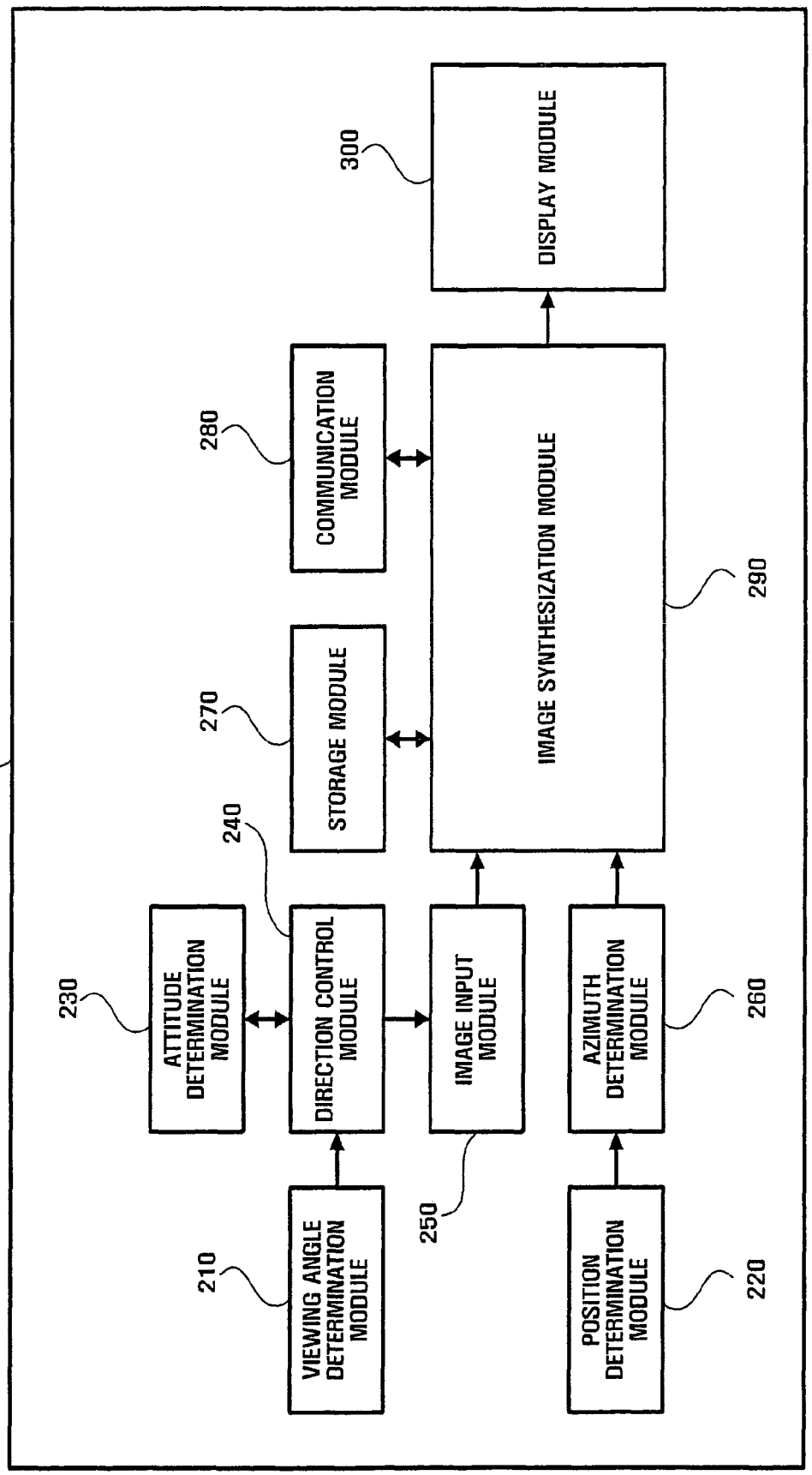
FIG. 2 is a block diagram of an augmented reality apparatus according to another embodiment of the present invention.

FIG. 2 is a block diagram of an augmented reality apparatus 200 according to another embodiment of the present invention. Referring to FIG. 2, the augmented reality apparatus 200 includes a viewing angle determination module 210, an attitude determination module 230, a direction control module 240, an image input module 250, a position determination module 220, an azimuth determination module 260, a storage module 270, a communication module 280, an image synthesization module 290, and a display module 300.

The viewing angle determination module 210 determines a viewing angle of a user. The viewing angle determination module 210 determines the viewing angle of the user using the positions of the pupils of the eyes of the user. For this, the viewing angle determination module 210 may include a digital camera and an IR filter. In other words, the viewing angle determination module 210 determines the viewing angle of the user by detecting the positions of the pupils of the user in an input image that renders the eyes of the user and is provided by the IR filter. Also, the viewing angle determination module 210 determines the viewing angle of the user according to the attitude of the augmented reality apparatus 200. For example, the viewing angle determination module 210 determines whether the viewing angle of a user faces forward, sideways, upward or downward.

Also, the viewing angle determination module 210 may determine the viewing angle of the user by referencing a direction toward which the face of the user turns. For this, the viewing angle determination module 210 may include an image recognition unit which can detect the direction toward which the face of the user turns using an input image that renders the face of the user.

The image input module 250 receives a subject image. The image input module 250 may receive a subject image using at least one of a spherical lens, an aspherical lens, a Fresnel lens, a holographic lens, and a grating coupler.

In order to control the direction of the image input module 250 according to the viewing angle of the user, the augmented reality apparatus 200 may also include a direction control module 240. The direction control module 240 controls the direction of the image input module 250 to correspond to the user viewing angle determined by the viewing angle determination module 210.

The direction of the image input module 250 may be inconsistent with the viewing angle of the user because of the attitude of the augmented reality apparatus 200. For example, even if the viewing angle determination module 210 determines based on the position of the eyes and the pupils of the eyes of the user that the user faces forward, the image input module 250 may be inconsistent with the user viewing angle determined by the viewing angle determination module 210 if the augmented reality apparatus 200 is not parallel to the face of the user. In this case, the direction of the image input module 250 must be appropriately compensated according to the attitude of the augmented reality apparatus 200. Accordingly, the direction of the image input module 250 may be determined according to the viewing angle of the user and the attitude of the augmented reality apparatus 200. For this, the attitude determination module 230 determines a relative attitude of the augmented reality apparatus 200 with respect to the user using a plurality of IR transceivers or ultrasound transceivers. The determining of the attitude of the augmented reality apparatus by the attitude determination module 230 will be described later in further detail with reference to FIGS. 6 through 8.

The image synthesization module 290 synthesizes the input image provided by the image input module 250 with a predetermined digital image. The digital image includes subject information which is determined according to the position of the user, an absolute azimuth of the direction of the image input module 250, and the attitude of the augmented reality apparatus 200. For example, if a subject is a building, the digital image may be text or an image including the name of the building, the distance between the user and the building, and the height of the building.

Also, the digital image is information customized for the user. The digital image may be stored in the storage module 270 or may be provided by an external digital image providing apparatus via a network. For example, for the same subject, e.g., for the same building, a digital image for user 1 may include only the name of the building, and a digital image for user 2 may include both the name of the building and the distance between user 2 and the building. Accordingly, the storage module 270 or an external digital image providing apparatus may store a plurality of digital images of the same subject together with the identifiers (IDs) of a plurality of users, respectively, to which the digital images are to be provided.

The display module 300 displays a synthesized image provided by the image synthesization module 290. The display module 300 may be a module equipped with an image display unit such as a cathode ray tube (CRT), a liquid crystal display (LCD), a light-emitting diode (LED), an organic light-emitting diode (OLED), or a plasma display panel. If the augmented reality apparatus 200 is a mobile phone, the display module 300 may be an LCD screen.

The synthesized image displayed by the display module 300 may be a still image or a moving image. If the synthesized image displayed by the display module 300 is a real-time image, the image synthesization module 290 may determine the position and attitude of a digital image so as to be consistent with the position of a subject rendered in the real-time image. The digital image comprises subject information which is determined according to the position of the user, an absolute azimuth of the direction of the image input module 250, and the attitude of the augmented reality apparatus 200. For this, the augmented reality apparatus 200 may also include a position determination module 220 and an azimuth determination module 260.

The position determination module 220 determines the position of the augmented reality apparatus 200. For this, the position determination module 220 may include a position determination unit such as a GPS receiver.

The azimuth determination module 260 determines the absolute azimuth of the direction of the image input module 250. In order to determine the absolute azimuth of the direction of the image input module 250, the azimuth determination module 260 may include an inertial sensor, a geomagnetic sensor, or a gyro sensor.

The storage module 270 stores digital images. As described above, the storage module 270 may store the digital images with the IDs of a plurality of users, respectively. The storage module 270 may be a module to/from which data can be input/output, such as a hard disc, a flash memory, a compact flash (CF) card, a secure digital (SD) card, a smart media (SM) card, a multimedia card (MMC), or a memory stick. The storage module 270 may be included in the augmented reality apparatus 200 or may be included in an external device. The augmented reality apparatus 200 may also include a communication module 280 which communicates with an external device.

The communication module 280 communicates with a digital image providing apparatus which provides digital images. The communication module 280 communicates with the digital image providing apparatus via a wireless local area network (LAN), WiBro, or a mobile telephone network. The communication module 280 may also communicate with and receive digital images from another augmented reality apparatus 200 within the communication range of the communication module 280.

Figure 3:
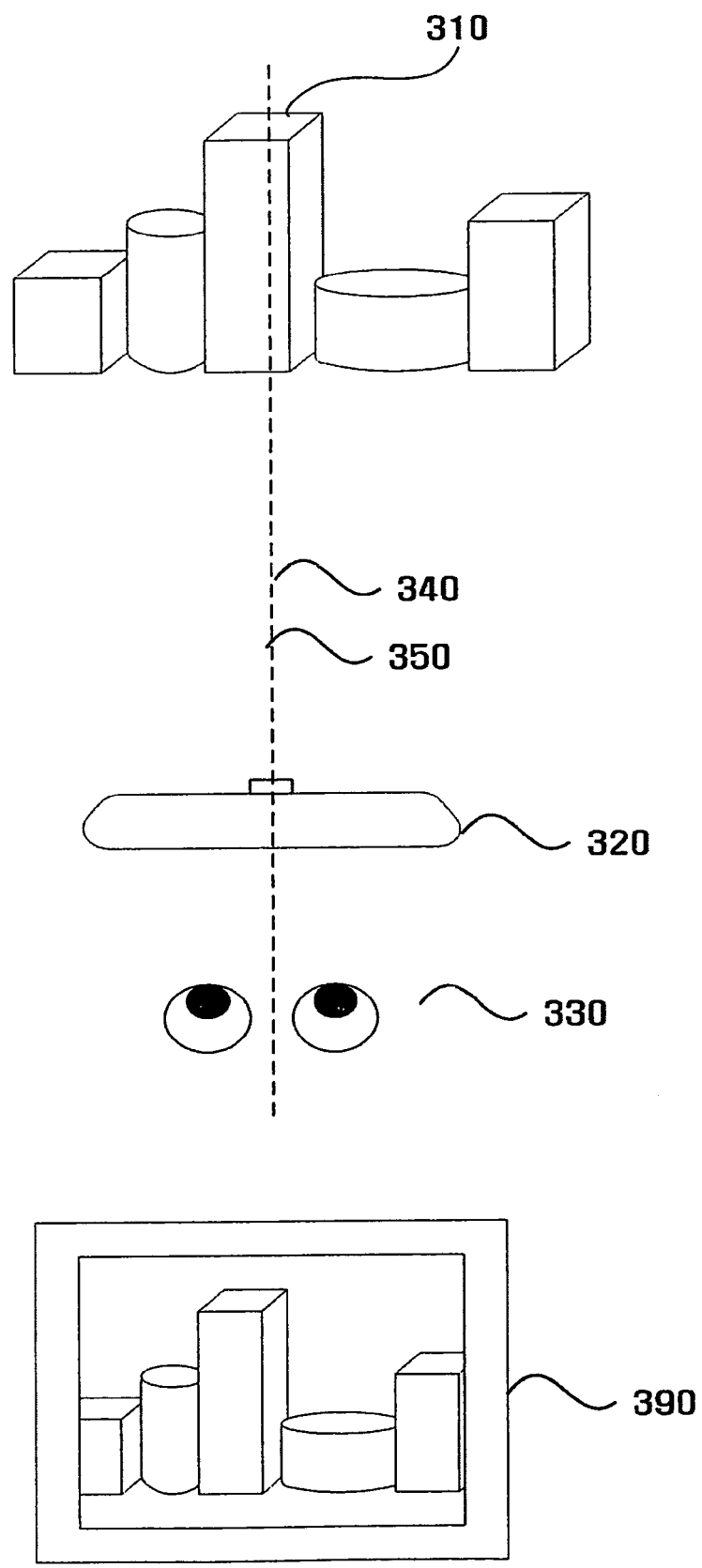
FIG. 3 is a diagram illustrating a subject, an augmented reality apparatus, and the eyes of a user which are aligned with one another.

FIG. 3 is a diagram illustrating a subject 310, an augmented reality apparatus 320, and the eyes 330 of a user which are aligned with one another. Referring to FIG. 3, a viewing angle 340 of the user is consistent with a direction 350 of an image input module of the augmented reality apparatus 320. Accordingly, an image 390 displayed by the augmented reality apparatus 320 is an image of the subject 310 perceived by the eyes 330 of the user.

The image 390 may be synthesized with a corresponding digital image, and the result of the synthesization may be displayed.

Figure 4:
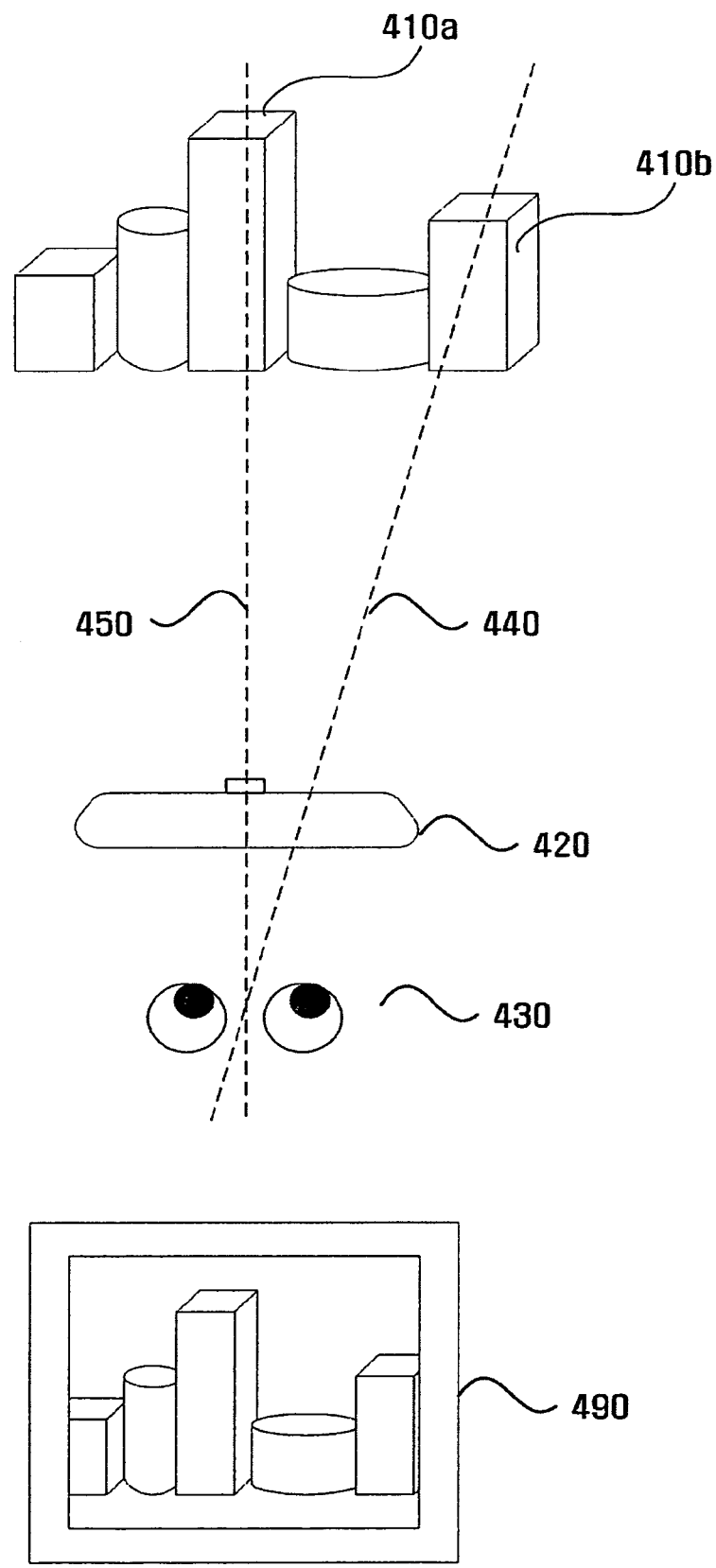
FIG. 4 is a diagram illustrating a subject, an augmented reality apparatus, and the eyes of a user which are not aligned with one another.

FIG. 4 is a diagram illustrating a subject 410b, an augmented reality apparatus 420, and the eyes 430 of a user that are not aligned with one another. Referring to FIG. 4, an image displayed by the augmented reality apparatus 420 may not be an image of the subject 410b perceived by the eyes 430 of the user.

In other words, a viewing angle 440 of the user is not consistent with a direction 450 of an image input module 250 of the augmented reality apparatus 420. Thus, unless the direction 450 of the image input module 250 of the augmented reality apparatus 420 is appropriately aligned, the displayed image 490 can be an image of a subject 410a which is in front of the augmented reality apparatus 420.

Figure 5:
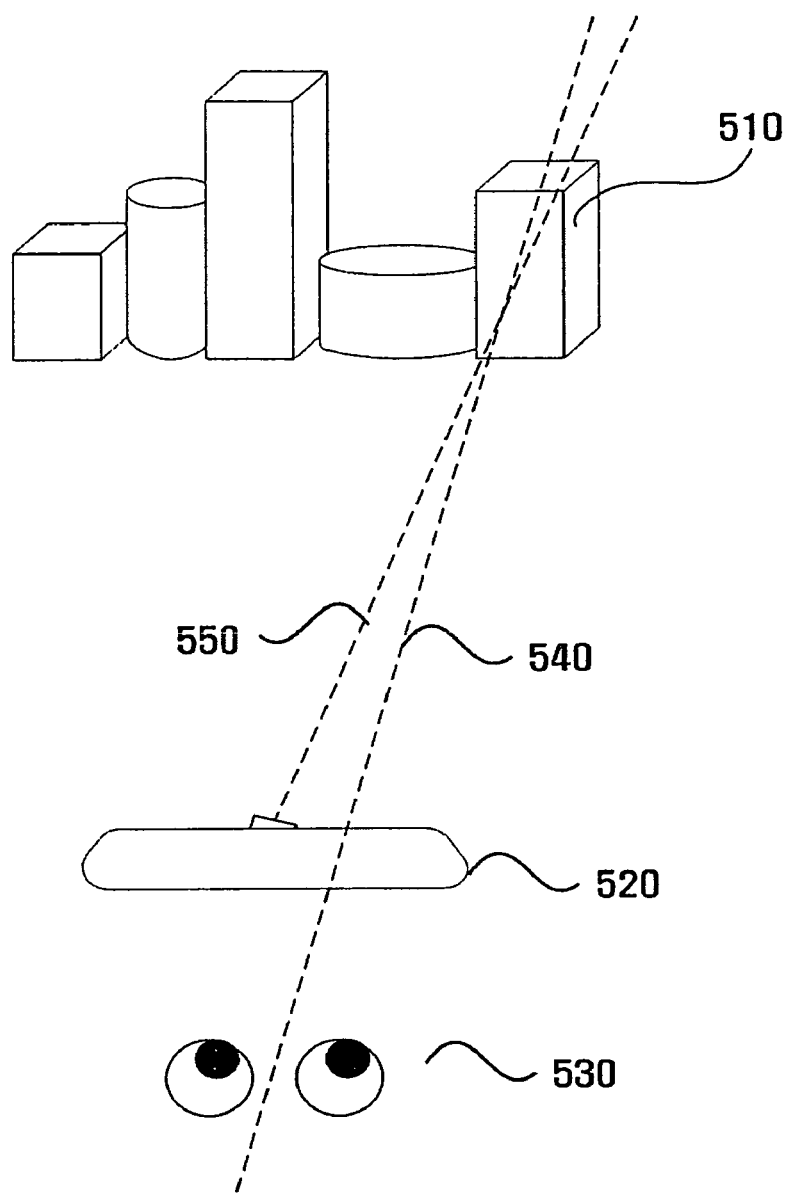
FIG. 5 is a diagram for explaining the displaying of a subject image by adjusting the direction of an image input module, according to an embodiment of the present invention.
Figure 5:
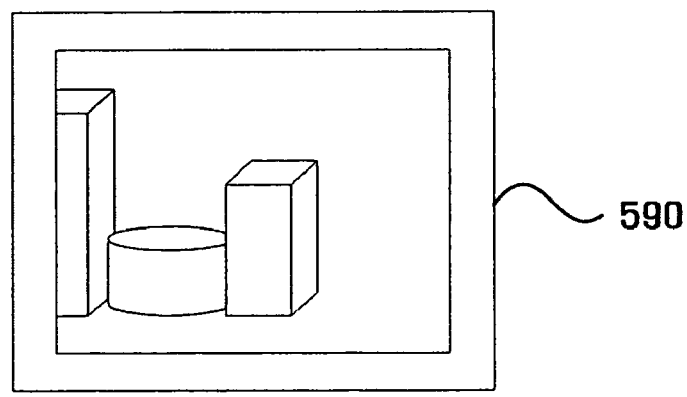

FIG. 5 is a diagram for explaining the displaying of an image of a subject 510, which is perceived by the eyes 530 of a user, by adjusting the direction of an image input module of an augmented reality apparatus 520 when the subject 510, the augmented reality apparatus 520 and the eyes 530 of the user are not aligned with one another, according to an embodiment of the present invention. Referring to FIG. 5, a direction 550 of the image input module 250 of the augmented reality apparatus 520 needs to be compensated to be consistent with a viewing angle 540 of the user. For this, a viewing angle determination module of the augmented reality apparatus determines the viewing angle 540 of the user. Thereafter, a direction control module 240 controls the direction 550 of the image input module of the augmented reality apparatus 520 to be consistent with the viewing angle 540 of the user. Then, the image input module of the augmented reality apparatus 520 can receive an image of the subject 510 perceived by the eyes 530 of the user, and an image 590 displayed by the augmented reality apparatus 520 is an image of the subject 510 perceived by the eyes 530 of the user.

Figure 6:
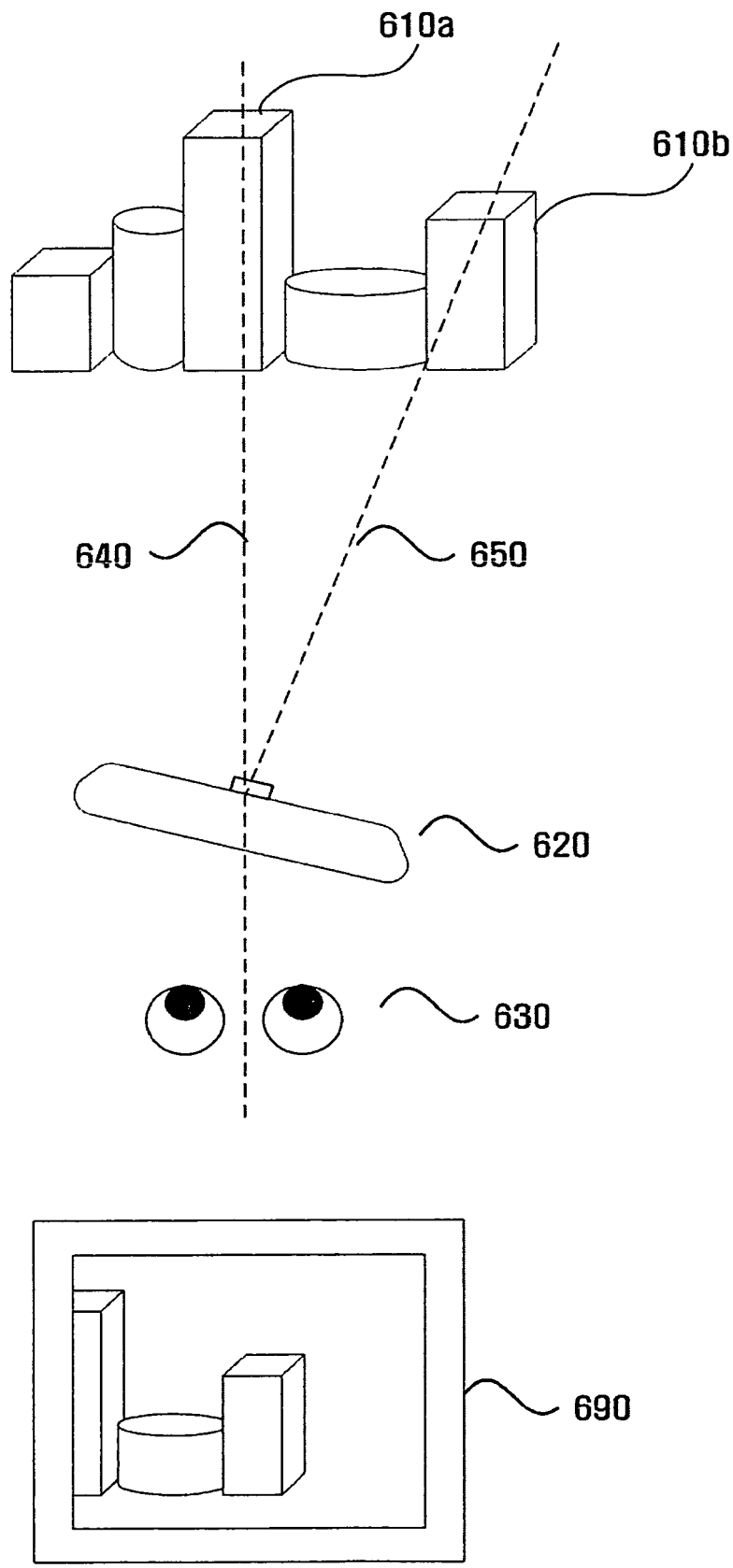
FIG. 6 is a diagram for explaining the displaying of a subject image according to the attitude of an augmented reality apparatus, according to an embodiment of the present invention.

FIG. 6 is a diagram for explaining the displaying of an image of a subject 610b according to the attitude of an augmented reality apparatus 620, according to an embodiment of the present invention.

Referring to FIGS. 3 through 5, display surfaces of the augmented reality apparatuses 320, 420, and 520 are in parallel with the user eyes 330, 430, and 530, respectively. In reality, however, a display surface of an augmented reality apparatus may not be in parallel with the eyes of a user.

Referring to FIG. 6, a subject 610a, the augmented reality apparatus 620, and the eyes 630 of a user are aligned with one another, a display surface of the augmented reality apparatus 620 is not in parallel with the eyes 630 of the user, and the user faces forward. Unless a direction control module of the augmented reality apparatus 620 controls the direction of an input image module of the augmented reality apparatus 620, the augmented reality apparatus 620 may not be able to display an image of the subject 610a, but only displays an image of the subject 610b received by the image input module 250 as an image 690.

In this case, an attitude determination module 230 of the augmented reality apparatus 620 may determine a relative attitude of the augmented reality apparatus 620 with respect to the user using a plurality of IR transceivers or ultrasound transceivers.

Figure 7:
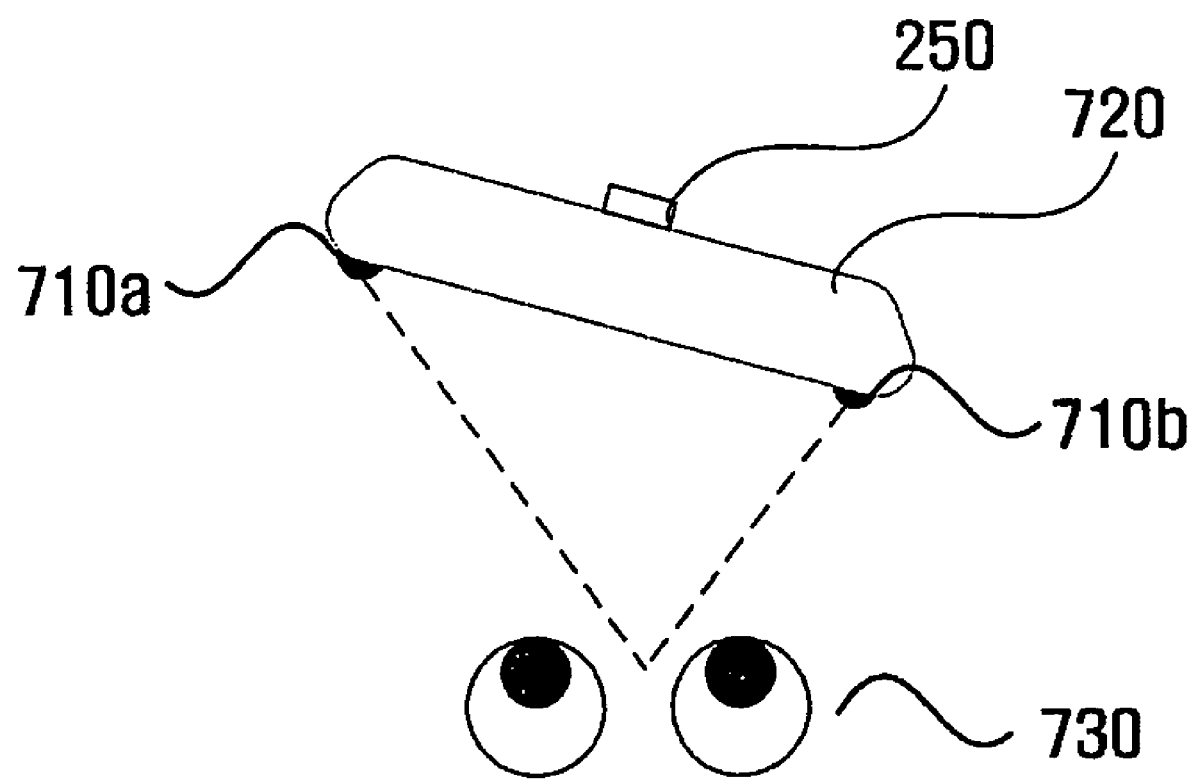
FIG. 7 is a diagram for explaining the determining of the attitude of an augmented reality apparatus, according to an embodiment of the present invention by an attitude determination module.

FIG. 7 is a diagram for explaining the determining of the attitude of an augmented reality apparatus 720 by an attitude determination module of the augmented reality apparatus 720, according to an embodiment of the present invention. Referring to FIG. 7, the augmented reality apparatus 720 determines a relative attitude of the augmented reality apparatus 720 with respect to the user using a plurality of IR transceivers or ultrasound transceivers 710a and 710b. In other words, the augmented reality apparatus 720 determines the attitude of the augmented reality apparatus 720 using distances between the eyes 730 of a user and the augmented reality apparatus 720 measured by the IR transceivers and the ultrasound transceivers 710a and 710b.

Referring to FIG. 7, a two-dimensional (2D) attitude of the augmented reality apparatus 720 is determined using two IR transceivers or ultrasound transceivers. However, a three-dimensional (3D) attitude of the augmented reality apparatus 720 may be determined using three or more IR transceivers or ultrasound transceivers.

Figure 8:
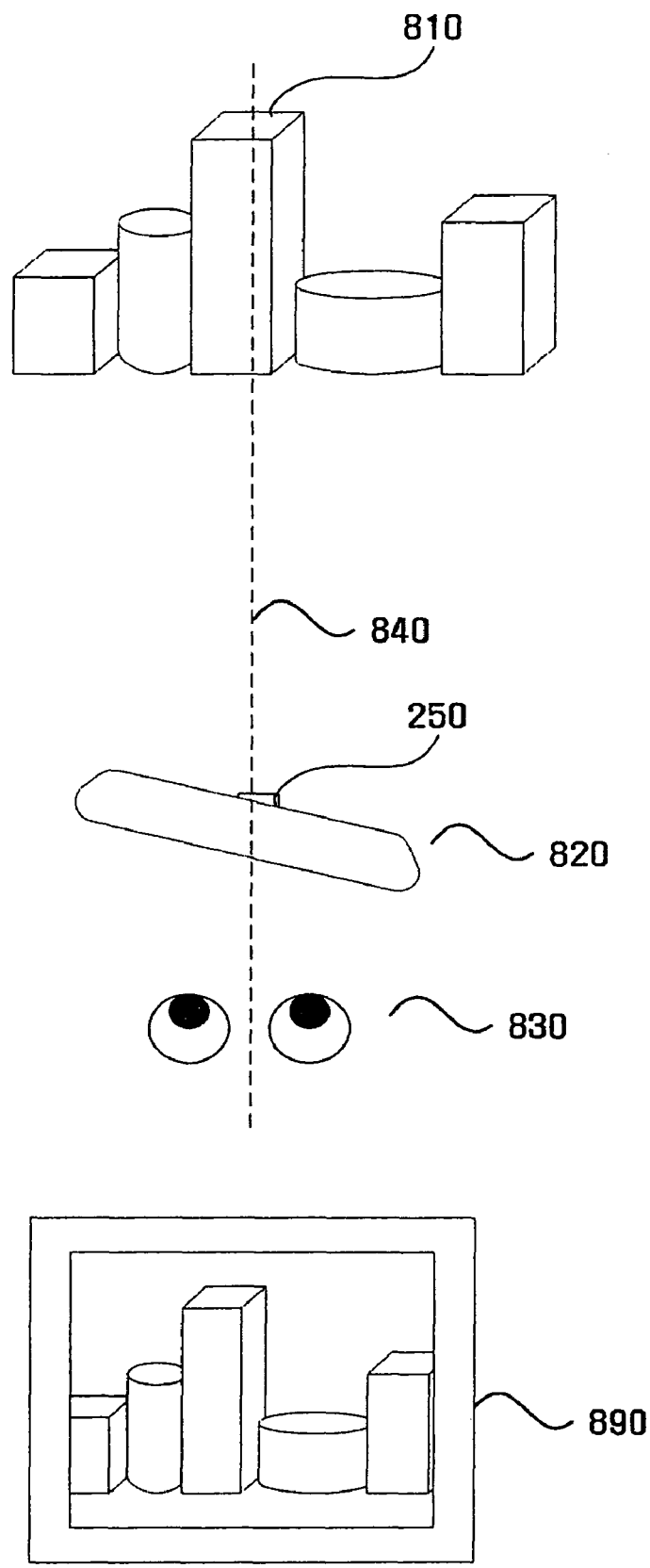
FIG. 8 is a diagram for explaining the displaying of a subject image with reference to the attitude of an augmented reality apparatus, according to another embodiment of the present invention.

FIG. 8 is a diagram for explaining the displaying of an image of a subject 810 desired by a user with reference to the attitude of an augmented reality apparatus 820 according to an embodiment of the present invention. Referring to FIG. 8, a direction control module of the augmented reality apparatus 820 adjusts the direction of an image input module of the augmented reality apparatus 820 with reference to a viewing angle 840 of a user and the attitude of the augmented reality apparatus 820. Accordingly, even when a display surface of the augmented reality apparatus 820 is not in parallel with the eyes 830 of the user, the augmented reality apparatus 820 can display an image 890 of the subject 810 regardless of the attitude of the augmented reality apparatus 820.

Figure 9:
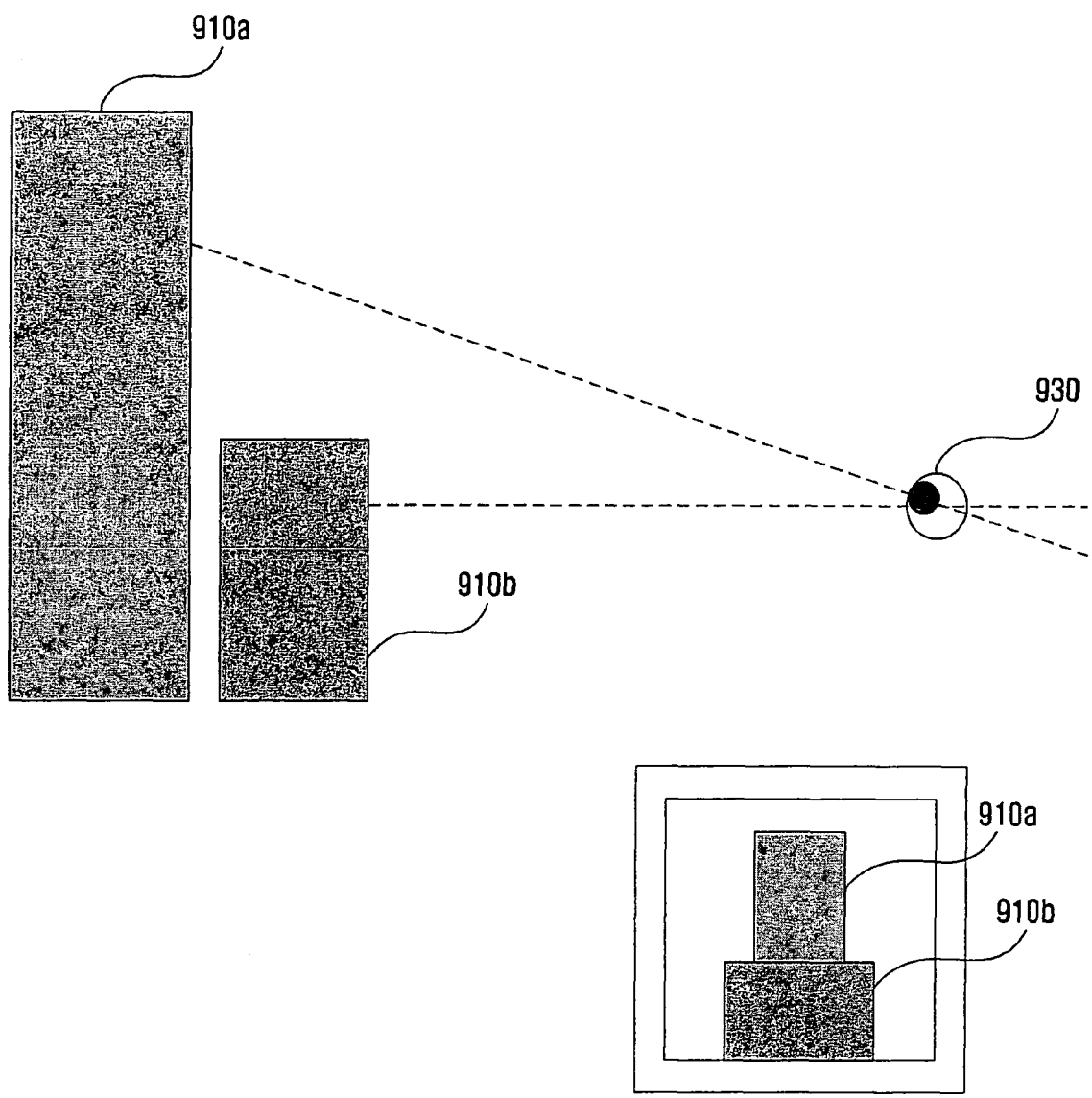
FIG. 9 is a diagram for explaining the determining of one of a plurality of subjects rendered in a subject image as a target subject according to an embodiment of the present invention.

FIG. 9 is a diagram for explaining the determining of one of a plurality of subjects 910a and 910b that are incident upon an image synthesization module 290 of the augmented reality apparatus 200 as a target subject according to an embodiment of the present invention. The augmented reality apparatus 200 extracts a digital image corresponding to a subject image that is incident upon the image input module 250 by referencing the absolute azimuth of the direction of the image input module 250. Referring to FIG. 9, a plurality of subjects, i.e., the subjects 910a and 910b, may be located together at the absolute azimuth of the direction of the image input module 250. In this case, the image synthesization module 290 determines whichever of the subjects 910a and 910b is closest to the augmented reality apparatus 200, i.e., the subject 910b, as a target subject, and extracts a digital image corresponding to the subject 910b.

The subject 910b is closer than the subject 910a to the augmented reality apparatus 200 and is lower than the subject 910b. If a subject perceived by the eyes 930 of the user is the subject 910a, the image synthesization module 290 may extract a digital image corresponding to the subject 910a.

In other words, the image synthesization module 290 determines the height of the subject 910a with reference to subject information stored in the storage module 270, and determines whether the subject 910a can be properly perceived by the eyes 930 of the user from where the user stands with reference to the position of the augmented reality apparatus 200 determined by the position determination module 220 and the attitude of the augmented reality apparatus 200 determined by the attitude determination module 230. If the subject 910a is determined to be able to be properly perceived by the eyes 930 of the user from where the user stands, the image synthesization module 290 considers the subject 910a as a target subject.

Figure 10:
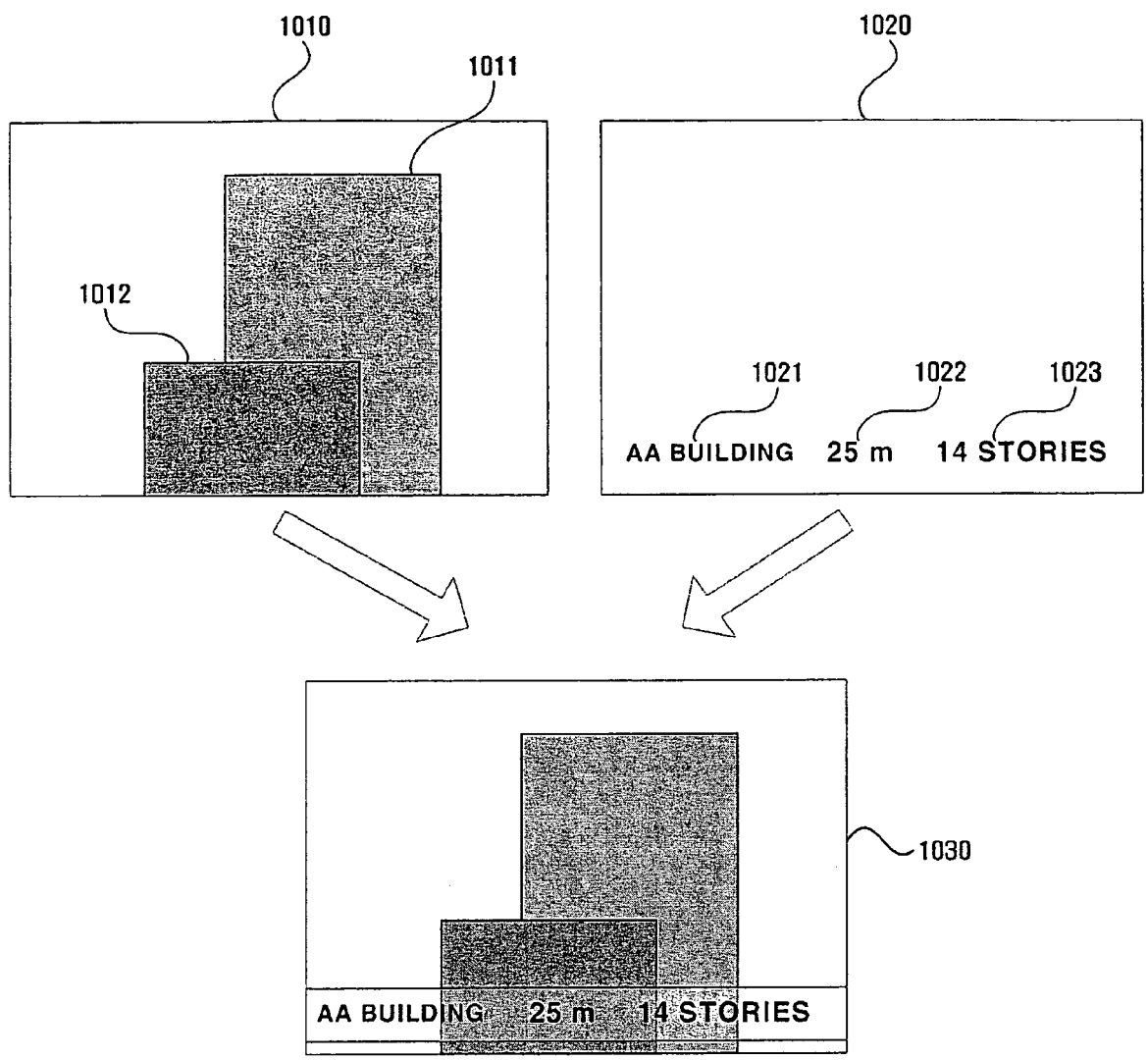
FIG. 10 presents a synthesized image obtained using the present invention.

FIG. 10 presents a synthesized image 1030 obtained using the present invention. Referring to FIG. 10, the synthesized image 1030 is obtained by synthesizing a subject image 1010 input via the image input module 250 and a digital image 1020 extracted from the storage module 270 or received from an external digital image providing apparatus via a network.

The position determination module 220 determines the position of the augmented reality apparatus 200, and the azimuth determination module 260 determines an absolute azimuth of the direction of the image input module 250. Then, the image synthesization module 290 obtains information regarding subjects 1011 and 1012 that are located at the absolute azimuth of the direction of the image input module 250 from the storage module 270 or a network. Since a plurality of subjects, i.e., the subjects 1011 and 1012, are located together at the same absolute azimuth, the image synthesization module 290 chooses whichever of the subjects 1011 and 1012 is closest to the augmented reality apparatus 200, i.e., the subject 1012, as a target subject.

Even though a subject image that renders two subjects is input via the image input module 250 and one of the two subjects is sufficiently close to the augmented reality apparatus 200 to be chosen as a target subject, like the subject 1012 illustrated in FIG. 10, one of the two subjects that is closer than the other to the augmented reality apparatus 200 may not be chosen as a target subject if not corresponding to the azimuth determined by the azimuth determination module 260. The digital image 1020 corresponding to whichever of the subjects 1011 and 1012 is chosen as a target subject by the image synthesization module 290 is extracted.

Thereafter, the synthesized image 1030 is obtained by inserting the digital image 1020 into the subject image 1010 so that the digital image 1020 can be displayed in a predetermined area on a display screen where the subject image 1010 is displayed. For example, if the subjects 1011 and 1012 are buildings, building name information 1021, distance information 1022, and building height information 1023 may be displayed.

The synthesized image 1030 may be a still image or a real-time image. If the synthesized image 1030 is a real-time image, the digital image 1020 may be altered according to the position of the augmented reality apparatus 200 and the direction of the image input module 250.

FIG. 11 is a flowchart illustrating an augmented reality method according to an embodiment of the present invention. Referring to FIG. 11, in operation S1110, the viewing angle determination module 210 determines the viewing angle of a user by detecting the positions of the pupils of the eyes of the user. For this, the viewing angle determination module 210 may include a digital camera or an IR filter.

In operation S1120, information regarding the determined viewing angle of the user is transmitted to the direction control module 240, and the direction control module 240 controls the attitude determination module 230 to determine the attitude of the augmented reality apparatus 200. Here, the attitude determination module 230 may determine a relative attitude of the augmented reality apparatus 200 with respect to the user using a plurality of IR transceivers or ultrasound transceivers.

In operation S1130, information regarding the determined attitude of the augmented reality apparatus 200 is transmitted to the direction control module 240, and the direction control module 240 adjusts the direction of the image input module 250 according to the determined viewing angle of the user and the determined attitude of the augmented reality apparatus 200. In operation S1140, the image input module 250 can receive an image of a subject which is located in a direction corresponding to the viewing angle of the user. The subject image received by the image input module 250 is transmitted to the image synthesization module 290.

The image synthesization module 290 receives the subject image, and also receives the information regarding the determined position of the augmented reality apparatus 200 and the information regarding the determined absolute azimuth of the direction of the image input module 250. Then, if the subject image includes more than one subject, the image synthesization module 290 can determine one of the subjects as a target object. In operation S1150, the image synthesization module 290 extracts a digital image corresponding to a subject rendered in the subject image from the storage module 270 or from an external digital image providing apparatus via a network. In operation S1160, the image synthesization module 290 synthesizes the subject image and the extracted digital image. Here, the extracted digital image may be a digital image customized for the user.

In operation S1170, a synthesized image obtained in operation S1160 is transmitted to the display module 300, and the display module 300 displays the synthesized image. The synthesized image may be a still image or a real-time image. If the synthesized image is a real-time image, the display module 300 may synthesize a subject image with digital information according to the viewing angle of the user, the position of the augmented reality apparatus 200, and the direction of the image input module 250 which are likely to vary in real time, and display the result of the synthesization.

As described above, the augmented reality apparatus and method according to the present invention can provide the following advantages.

First, even when the viewing angle of a camera of the augmented reality apparatus according to the present invention is not consistent with the viewing angle of a user, it is possible to provide the user with an augmented reality image for a subject desired by the user by adjusting the direction of the camera to be consistent with a direction toward which the user faces and realizing an augmented reality image for a subject rendered in a subject image incident upon the camera.

Second, it is possible to properly realize an augmented reality image even when the user, the augmented reality apparatus according to the present invention, and a subject are not aligned with one another. Thus, it is possible to allow the user to view the subject even when the subject is shielded from view by the augmented reality apparatus according to the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An augmented reality apparatus comprising:
   a viewing angle determination module which determines a viewing angle of a user;
   an attitude determination module which determines an attitude of the augmented reality apparatus using distances between the user and the augmented reality apparatus measured by at least two distance sensors;
   an image input module which captures an image of one or more subjects;
   a direction control module which controls a direction of the image input module based on the viewing angle of the user and the attitude of the augmented reality apparatus;
   an image synthesization module which generates a synthesized image by synthesizing the captured image with a digital image; and
   a display module which displays the synthesized image.

2. The augmented reality apparatus of claim 1, wherein the viewing angle determination module determines the viewing angle of the user by detecting the positions of the pupils of the eyes of the user.

3. The augmented reality apparatus of claim 1, wherein the at least two distance sensors include IR transceivers or ultrasound transceivers.

4. The augmented reality apparatus of claim 3, wherein the digital image comprises information regarding whichever of the subjects is deemed closest to the augmented reality apparatus according to the position of the user, an absolute azimuth of the direction of the image input module, and an attitude of the augmented reality apparatus.

5. The augmented reality apparatus of claim 4 further comprising an azimuth determination module which determines the absolute azimuth of the direction of the image input module.

6. The augmented reality apparatus of claim 1, wherein the digital image comprises information customized for the user.

7. The augmented reality apparatus of claim 1, wherein the synthesized image is a still image or a real-time image.

8. An augmented reality method comprising:
  determining a viewing angle of a user;
  determining an attitude of the augmented reality apparatus using distances between the user and the augmented reality apparatus measured by at least two distance sensors;
  controlling a direction of image input of the augmented reality apparatus based on the viewing angle of the user and the attitude of the augmented reality apparatus;
  capturing an image of one or more subjects in the direction of image input;
  generating a synthesized image by synthesizing the subject image with a digital image; and
  displaying the synthesized image.

9. The augmented reality method of claim 8, wherein the determining of the viewing angle of the user comprises determining the viewing angle of the user by detecting the positions of the pupils of the eyes of the user.

10. The augmented reality method of claim 8, wherein the at least two distance sensors include IR transceivers or ultrasound transceivers.

11. The augmented reality method of claim 10, wherein the digital image comprises information regarding whichever of the subjects is deemed closest to the augmented reality apparatus according to the position of the user, an absolute azimuth of the direction of the image input module, and an attitude of the augmented reality apparatus.

12. The augmented reality method of claim 11 further comprising determining the absolute azimuth of the direction of the image input module.

13. The augmented reality method of claim 8, wherein the digital image comprises information customized for the user.

14. The augmented reality method of claim 8, wherein the synthesized image is a still image or a real-time image.

* * * * *